United States Patent
Kobayashi

(10) Patent No.: US 8,015,186 B2
(45) Date of Patent: Sep. 6, 2011

(54) INFORMATION PROCESSING APPARATUS AND METHOD, RECORDING MEDIUM, AND PROGRAM

(75) Inventor: Yoshiyuki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 11/183,989

(22) Filed: Jul. 19, 2005

(65) Prior Publication Data
US 2006/0026155 A1   Feb. 2, 2006

(30) Foreign Application Priority Data
Jul. 29, 2004   (JP) ................... 2004-221114

(51) Int. Cl.
G06F 7/00 (2006.01)
G06F 17/30 (2006.01)
(52) U.S. Cl. ......... 707/736; 707/749; 707/770; 707/796
(58) Field of Classification Search ............... 707/5
See application file for complete search history.

(56) References Cited

U.S. PATENT DOCUMENTS

| | | | | |
|---|---|---|---|---|
| 4,972,349 A * | 11/1990 | Kleinberger | ...... | 707/1 |
| 5,682,466 A * | 10/1997 | Maeda et al. | ...... | 706/46 |
| 5,793,862 A * | 8/1998 | Sato et al. | ...... | 379/386 |
| 5,907,836 A * | 5/1999 | Sumita et al. | ...... | 707/2 |
| 6,442,538 B1 * | 8/2002 | Nojima | ...... | 707/1 |
| 6,519,360 B1 * | 2/2003 | Tanaka | ...... | 382/162 |
| 6,681,060 B2 * | 1/2004 | Acharya et al. | ...... | 382/305 |
| 6,970,637 B1 * | 11/2005 | Yoshida | ...... | 386/46 |
| 2001/0049664 A1 * | 12/2001 | Kashino et al. | ...... | 705/52 |
| 2002/0123990 A1 * | 9/2002 | Abe et al. | ...... | 707/3 |
| 2003/0107569 A1 * | 6/2003 | Endo et al. | ...... | 345/419 |
| 2004/0078363 A1 * | 4/2004 | Kawatani | ...... | 707/3 |
| 2004/0193288 A1 * | 9/2004 | Oka | ...... | 700/1 |
| 2005/0141767 A1 * | 6/2005 | Nishiyama et al. | ...... | 382/190 |
| 2006/0173872 A1 * | 8/2006 | Koike et al. | ...... | 707/100 |
| 2006/0271534 A1 * | 11/2006 | Hamaguchi et al. | ...... | 707/5 |
| 2006/0294093 A1 * | 12/2006 | Yamamoto et al. | ...... | 707/5 |
| 2007/0293959 A1 * | 12/2007 | Takezawa et al. | ...... | 700/44 |

FOREIGN PATENT DOCUMENTS

| | | |
|---|---|---|
| JP | 11-238078 | 8/1999 |
| JP | 2000-285141 | 10/2000 |
| JP | 2006-508446 | 3/2006 |
| WO | WO 2004/049206 | 6/2004 |

* cited by examiner

*Primary Examiner* — Pierre M Vital
*Assistant Examiner* — Berhanu Mitiku
(74) *Attorney, Agent, or Firm* — Oblon, Spivak, McClelland, Maier & Neustadt, L.L.P.

(57) ABSTRACT

An input unit supplies a logic operation expression made up of a plurality of retrieval keys and logic operators between the retrieval keys, entered by the user, to a control unit. A similarity calculating unit calculates similarities between key contents designated by the retrieval keys and a plurality of retrievable contents, based on feature quantities of contents that are supplied from a feature quantity extraction unit and a feature quantity database. A combining unit performs logic operations using the similarities between the key contents and the retrievable contents, calculating combined scores for the respective retrievable contents. The retrievable contents which have large combined scores are presented as contents best suited to the user. The present invention is applicable to an information processing apparatus for retrieving contents, for example.

15 Claims, 11 Drawing Sheets

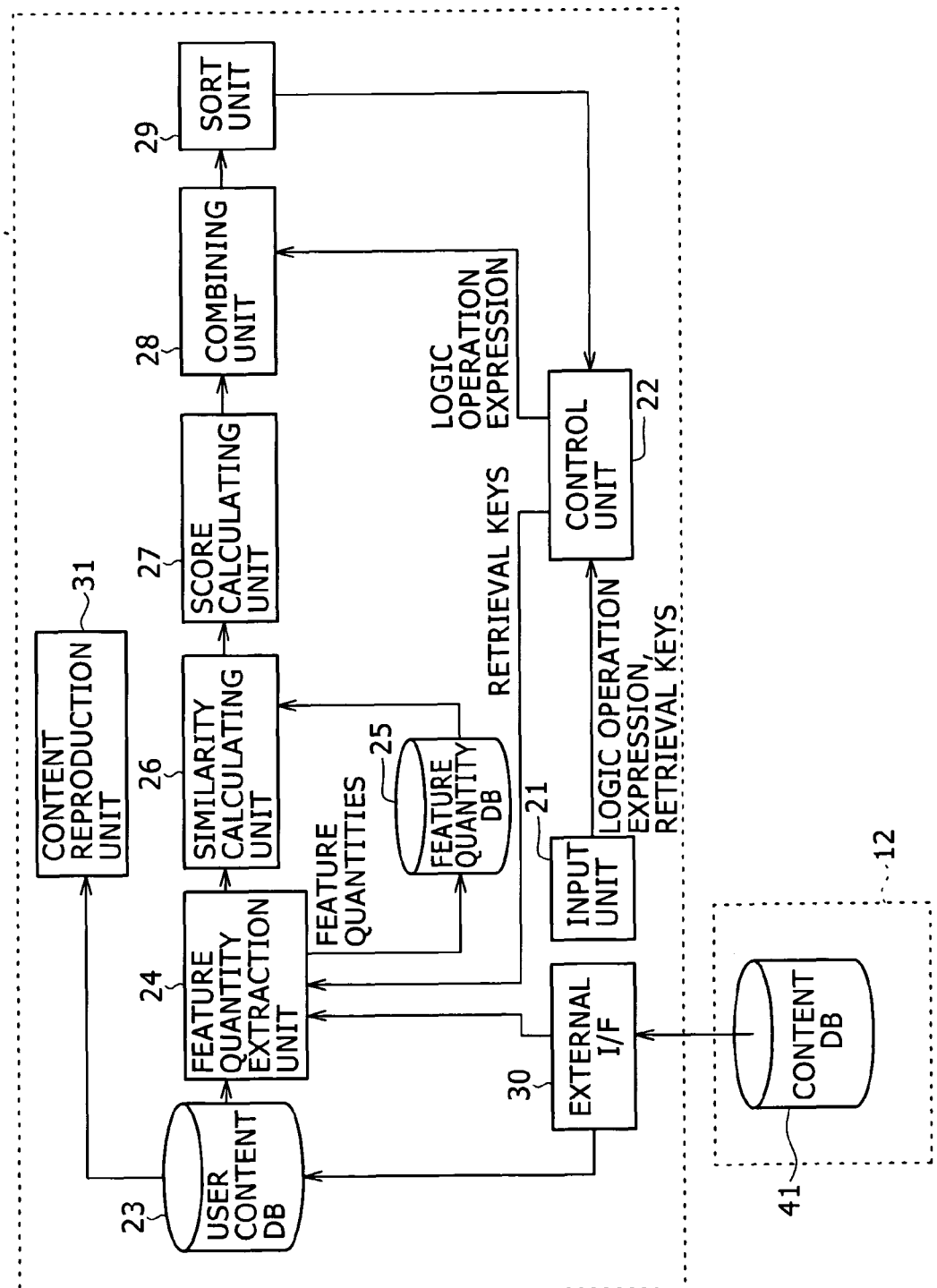

FIG. 2

| KEY CONTENT | TYPES OF FEATURE QUANTITIES | VALUES OF FEATURE QUANTITIES |
|---|---|---|
| CONTENT $KB_1$ | TEMPO | 0.5 |
| | MOOD | 0.3 |
| | NUMBER OF SOUNDS | 0.6 |
| CONTENT $KB_2$ | TEMPO | 0.9 |
| | MOOD | 0.4 |
| | NUMBER OF SOUNDS | 0.2 |
| ⋮ | | |
| CONTENT $KB_n$ | TEMPO | 0.2 |
| | MOOD | 0.8 |
| | NUMBER OF SOUNDS | 0.5 |

FIG. 3

| RETRIEVABLE CONTENT | TYPES OF FEATURE QUANTITIES | VALUES OF FEATURE QUANTITIES |
|---|---|---|
| CONTENT $A_1$ | TEMPO | 0.4 |
| | MOOD | 0.2 |
| | NUMBER OF SOUNDS | 0.8 |
| CONTENT $A_2$ | TEMPO | 0.3 |
| | MOOD | 0.5 |
| | NUMBER OF SOUNDS | 0.5 |
| ⋮ | | |
| CONTENT $A_m$ | TEMPO | 0.4 |
| | MOOD | 0.6 |
| | NUMBER OF SOUNDS | 0.1 |

FIG. 4

SCORE BY CONTENT $KB_1$
  SCORE $s_{1,1}$ OF CONTENT $KB_1$ AND CONTENT $A_1$
  SCORE $s_{1,2}$ OF CONTENT $KB_1$ AND CONTENT $A_2$
  ⋮
  SCORE $s_{1,m}$ OF CONTENT $KB_1$ AND CONTENT $A_m$

SCORE BY CONTENT $KB_2$
  SCORE $s_{2,1}$ OF CONTENT $KB_2$ AND CONTENT $A_1$
  SCORE $s_{2,2}$ OF CONTENT $KB_2$ AND CONTENT $A_2$
  ⋮
  SCORE $s_{2,m}$ OF CONTENT $KB_2$ AND CONTENT $A_m$

⋮

SCORE BY CONTENT $KB_n$
  SCORE $s_{n,1}$ OF CONTENT $KB_n$ AND CONTENT $A_1$
  SCORE $s_{n,2}$ OF CONTENT $KB_n$ AND CONTENT $A_2$
  ⋮
  SCORE $s_{n,m}$ OF CONTENT $KB_n$ AND CONTENT $A_m$

FIG. 5

INPUT: LOGIC OPERATION EXPRESSION: CONTENT $KB_1$ AND CONTENT $KB_2$ AND $\cdots$ AND CONTENT $KB_n$

→

COMBINED SCORES S FOR RESPECTIVE RETRIEVABLE CONTENT:

COMBINED SCORE $S_1$ OF CONTENT $A_1 = s'_{1,1} \times s'_{2,1} \times \cdots \times s'_{n,1}$ COMBINED SCORE $S_2$ OF CONTENT $A_2 = s'_{1,2} \times s'_{2,2} \times \cdots \times s'_{n,2}$ $\vdots$ COMBINED SCORE $S_m$ OF CONTENT $A_m = s'_{1,m} \times s'_{2,m} \times \cdots \times s'_{n,m}$

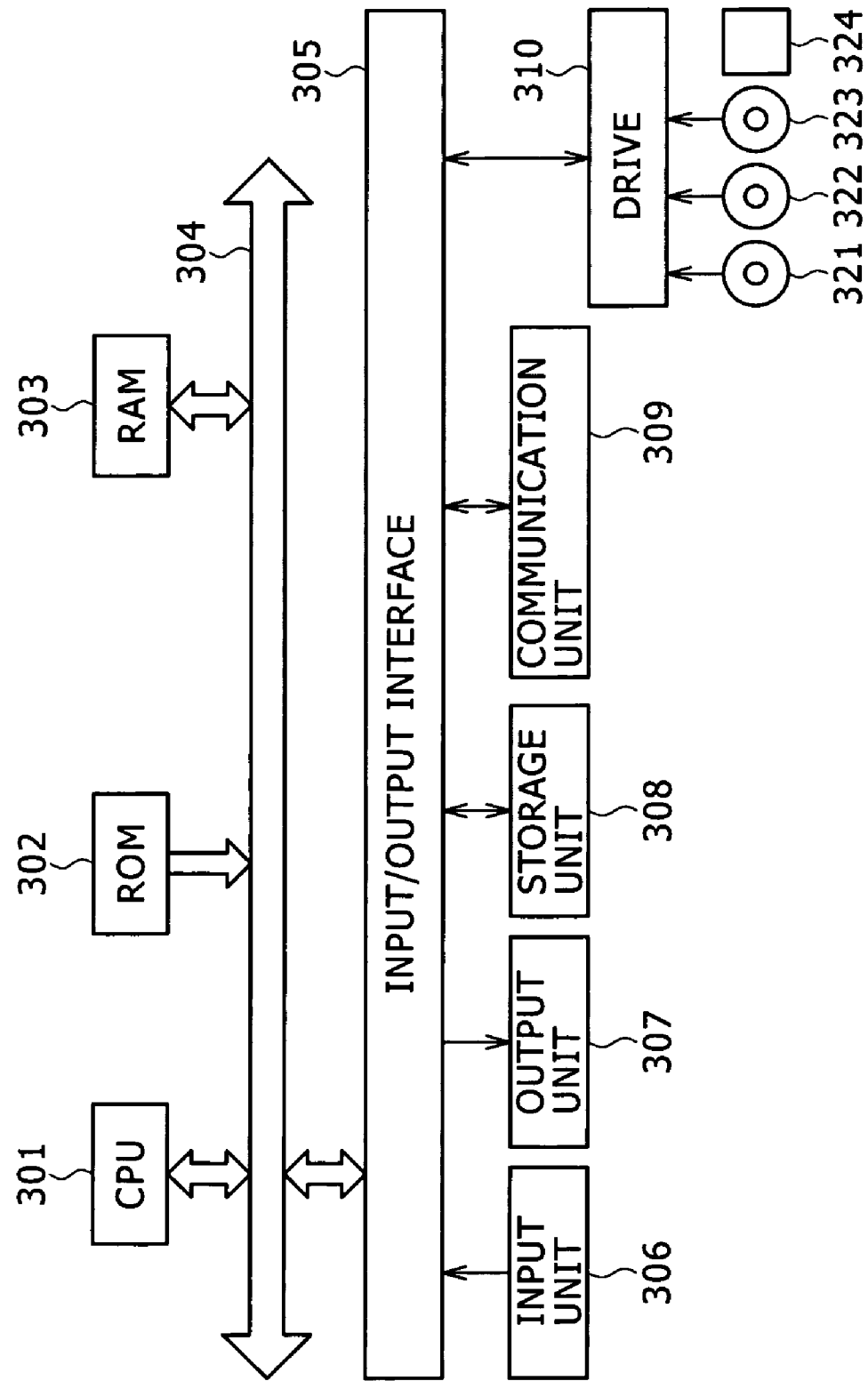

INFORMATION PROCESSING APPARATUS AND METHOD, RECORDING MEDIUM, AND PROGRAM

BACKGROUND OF THE INVENTION

The present invention relates to an information processing apparatus and method, a recording medium, and a program, and more particularly to an information processing apparatus and method, a recording medium, and a program for increasing the accuracy of retrieved contents in a process of retrieving contents that are best suited to users.

There are available various many contents including television and radio broadcast programs, movies, images such as photographs, music pieces (audio data), and various items of information including cooking, travel, shopping information from sites on the Internet. It is customary for users themselves to retrieve contents that are suited to their preferences from the available contents.

In related art, as a process of retrieving contents that are suited to the preference of a user, there is employed a similar object retrieval apparatus which is supplied with a single retrieval key object (content) as a retrieval key, calculates similarities between the retrieval key object and objects from feature quantities of the retrieval key object and feature quantities of the objects which are stored in a feature quantity storage and management device, sequences those objects whose similarities are higher than a predetermined value in the order of decreasing similarities, and outputs the sequenced objects. For details, reference should be made to Japanese Patent Laid-open No. Hei 10-171826.

According to the above conventional process of retrieving contents, only one retrieval key (content) is given as a condition for retrieving contents, and contents that are best suited to a user are retrieved based on the retrieval key.

However, retrieving contents based on the information of only one retrieval key is disadvantageous in that the retrieval key may not fully reflect the user's preference, and contents which do not match the user's preference may possibly be retrieved or presented. Therefore, the accuracy of retrieved contents may not necessarily be high.

If a plurality of retrieval keys are used as conditions for retrieving contents, then they reflect the user's preference more accurately and are effective to increase the accuracy of retrieved contents.

SUMMARY OF THE INVENTION

It is therefore an object of the present invention to increase the accuracy of retrieved contents in a process of retrieving contents that are best suited to users.

According to the present invention, there is provided an information processing apparatus for retrieving contents best suited to the user from among a plurality of retrievable contents, including an input unit for entering a logic operation expression made up of a plurality of retrieval keys designating a plurality of key contents, respectively, and logic operators between the retrieval keys, a similarity calculating unit for calculating similarities between the key contents designated by the retrieval keys of the logic operation expression entered through the input unit and the retrievable contents, with respect to all the key contents, a combined score calculating unit for performing logic operations using the similarities between the key contents and the retrievable contents corresponding to the retrieval keys, instead of the retrieval keys of the logic operation expression entered through the input unit, to calculate combined scores for the respective retrievable contents, and a presenting unit for presenting contents best suited to the user from among the retrievable contents, based on the combined scores calculated by the combined score calculating unit.

The similarity calculating unit may calculate similarities between the key contents and the retrievable contents using a plurality of feature quantities of the contents, with respect to all the key contents.

The information processing apparatus may further include an extracting unit for extracting each of the feature quantities of the contents.

The input unit may enter weights for the respective feature quantities of the contents, and the similarity calculating unit may calculate similarities between the key contents and the retrievable contents using a plurality of feature quantities of the contents which are weighted by the weights entered through the input unit, with respect to all the key contents.

Each of the logic operators may include at least one of AND, OR, and NOT.

According to the present invention, there is also provided a method of processing information for retrieving contents best suited to the user from among a plurality of retrievable contents, including the steps of entering a logic operation expression made up of a plurality of retrieval keys designating a plurality of key contents, respectively, and logic operators between the retrieval keys, calculating similarities between the key contents designated by the retrieval keys of the logic operation expression entered in the entering step and the retrievable contents, with respect to all the key contents, performing logic operations using the similarities between the key contents and the retrievable contents corresponding to the retrieval keys, instead of the retrieval keys of the logic operation expression entered in the entering step, to calculate combined scores for the respective retrievable contents, and presenting contents best suited to the user from among the retrievable contents, based on the combined scores calculated in the combined score calculating step.

A program stored in a recording medium according to the present invention includes the steps of entering a logic operation expression made up of a plurality of retrieval keys designating a plurality of key contents, respectively, and logic operators between the retrieval keys, calculating similarities between the key contents designated by the retrieval keys of the logic operation expression entered in the entering step and the retrievable contents, with respect to all the key contents, performing logic operations using the similarities between the key contents and the retrievable contents corresponding to the retrieval keys, instead of the retrieval keys of the logic operation expression entered in the entering step, to calculate combined scores for the respective retrievable contents, and presenting contents best suited to the user from among the retrievable contents, based on the combined scores calculated in the combined score calculating step.

A program according to the present invention enables a computer to carry out a process including the steps of entering a logic operation expression made up of a plurality of retrieval keys designating a plurality of key contents, respectively, and logic operators between the retrieval keys, calculating similarities between the key contents designated by the retrieval keys of the logic operation expression entered in the entering step and the retrievable contents, with respect to all the key contents, performing logic operations using the similarities between the key contents and the retrievable contents corresponding to the retrieval keys, instead of the retrieval keys of the logic operation expression entered in the entering step, to calculate combined scores for the respective retrievable contents, and presenting contents best suited to the user from among the retrievable contents, based on the combined scores calculated in the combined score calculating step.

According to the present invention, a logic operation expression made up of a plurality of retrieval keys designating a plurality of key contents, respectively, and logic operators between the retrieval keys is entered, and similarities between the key contents designated by the retrieval keys of the logic operation expression that is entered and the retrievable contents are calculated with respect to all the key contents. Logic operations are performed using the similarities between the key contents and the retrievable contents corresponding to the retrieval keys, instead of the retrieval keys of the logic operation expression, to calculate combined scores for the respective retrievable contents, and contents best suited to the user are presented from among the retrievable contents, based on the combined scores that are calculated.

According to the present invention, the accuracy of retrieved contents is increased in the retrieval of contents that are best suited to the user.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 1 is a block diagram of a content presenting system according to an embodiment of the present invention;

FIG. 2 is a diagram showing feature quantities of key contents;

FIG. 3 is a diagram showing feature quantities stored in a feature quantity database (DB) of the content presenting system shown in FIG. 1;

FIG. 4 is a diagram illustrative of how scores are calculated by a score calculator of the content presenting system shown in FIG. 1;

FIG. 5 is a diagram illustrative of how scores are combined by a score combiner of the content presenting system shown in FIG. 1;

FIG. 12 is a block diagram of a computer to which the present invention is applied.

DETAILED DESCRIPTION OF THE PREFERRED EMBODIMENTS

Figure 6:
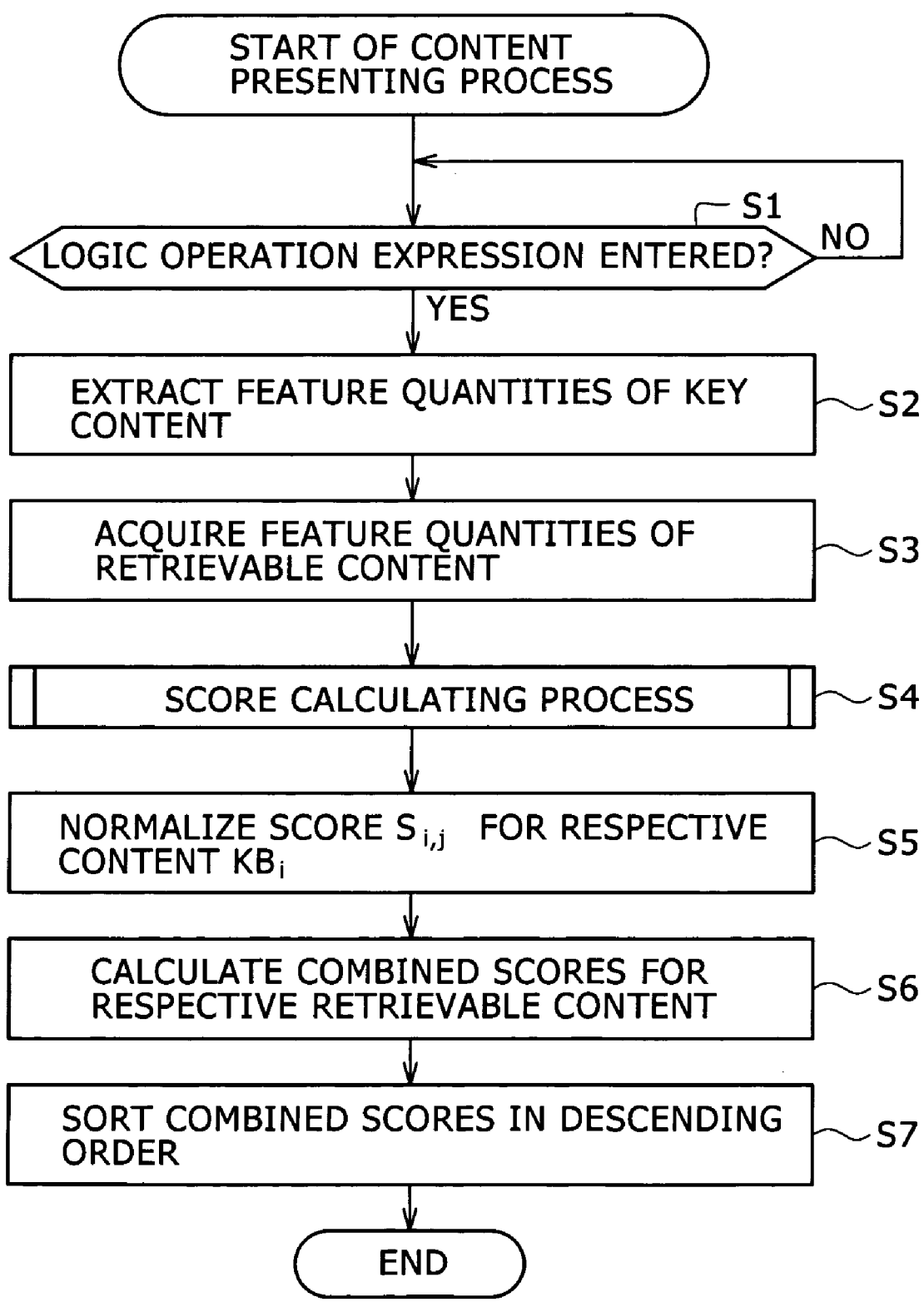
FIG. 6 is a flowchart of a content presenting process performed by the content presenting system shown in FIG. 1.

Components called for in claims and specific components described in the embodiments below are related to each other as described below. The description of the relation between those claimed components and specific components serves to confirm that the specific components that support the invention described in the claims are described in the embodiments. Just because there are specific components described in the embodiment, but not described to refer to claimed components does not necessarily mean that those specific components do not correspond to claimed components. Conversely, just because there are specific components described to refer to claimed components does not necessarily mean that those specific components do not correspond to other components than claimed components.

The description of the relation between those claimed components and specific components does not serve to confirm that all of the specific components described in the embodiment are called for in the claims. Stated otherwise, the description of the relation between those claimed components and specific components does not deny the existence of inventions covering specific components that are described in the embodiment, but not called for in the claims, i.e., the existence of inventions which may be filed in divisional applications and/or added by way of amendments in the future.

According to the present invention, there is provided an information processing apparatus, e.g., a user content presenting apparatus 11 shown in FIG. 1, for retrieving contents best suited to the user from among a plurality of retrievable contents, including:

an input unit, e.g., an input unit 21 shown in FIG. 1, for entering a logic operation expression made up of a plurality of retrieval keys designating a plurality of key contents, respectively, and logic operators between the retrieval keys;

a similarity calculating unit, e.g., a similarity calculating unit 26 shown in FIG. 1, for calculating similarities between the key contents designated by the retrieval keys of the logic operation expression entered through the input unit and the retrievable contents, with respect to all the key contents;

a combined score calculating unit, e.g., a score calculator 28 shown in FIG. 1, for performing logic operations using the similarities between the key contents and the retrievable contents corresponding to the retrieval keys, instead of the retrieval keys of the logic operation expression entered through the input unit, to calculate combined scores for the respective retrievable contents; and a presenting unit, e.g., a control unit 22 shown in FIG. 1, for presenting contents best suited to the user from among the retrievable contents, based on the combined scores calculated by the combined score calculating unit.

The information processing apparatus further includes an extracting unit, e.g., a feature quantity extraction unit 24 shown in FIG. 1, for extracting each of the feature quantities of the contents.

Figure 7:
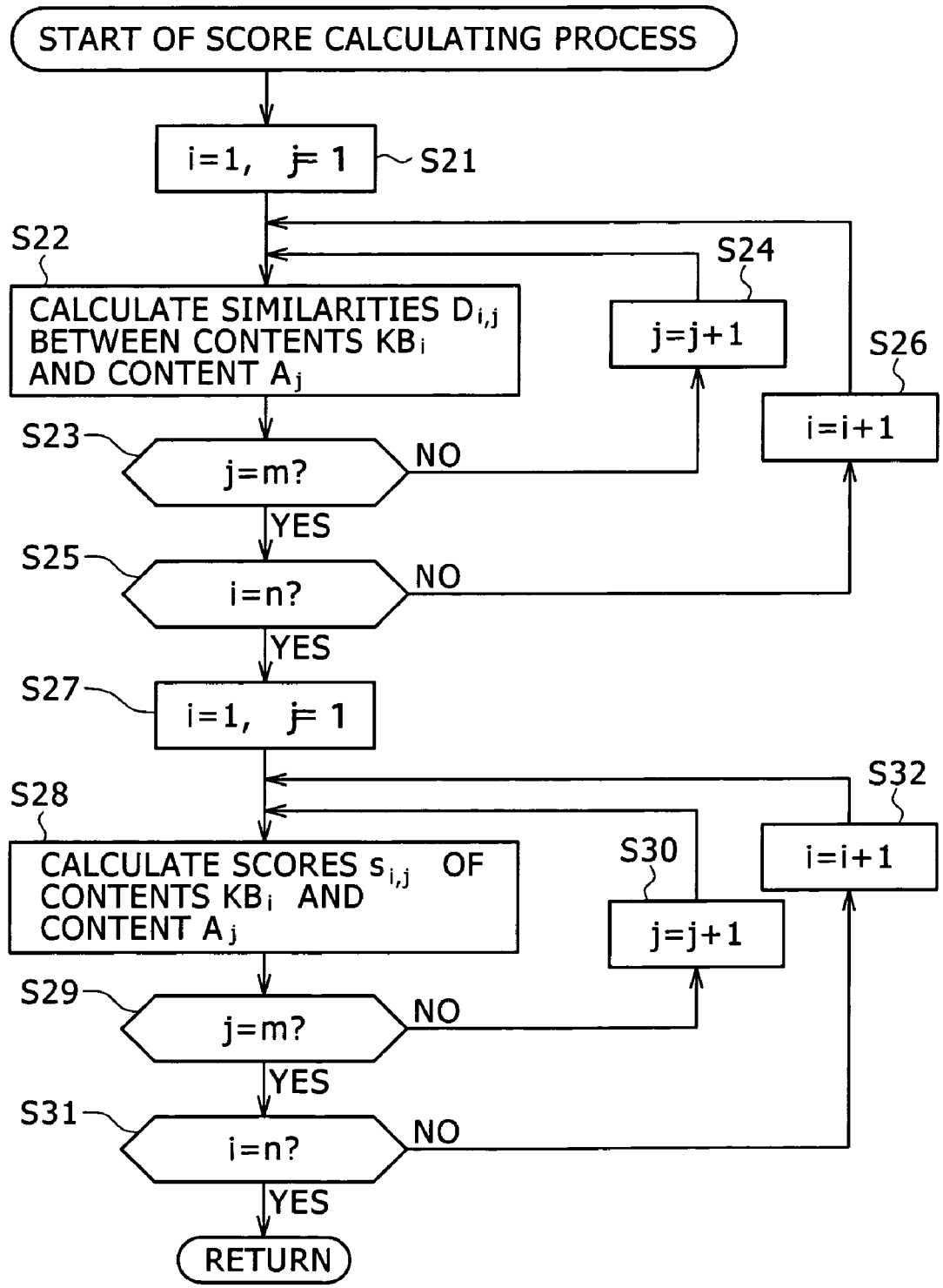
FIG. 7 is a flowchart of a score calculating process performed by the content presenting system shown in FIG. 1.

According to the present invention, there is also provided a method of processing information for retrieving contents best suited to the user from among a plurality of retrievable contents, including the steps of:

entering, e.g., in step S1 shown in FIG. 6, a logic operation expression made up of a plurality of retrieval keys designating a plurality of key contents, respectively, and logic operators between the retrieval keys;

calculating, e.g., in step S22 shown in FIG. 7, similarities between the key contents designated by the retrieval keys of the logic operation expression entered in the entering step and the retrievable contents, with respect to all the key contents;

performing, e.g., in step S6 shown in FIG. 6, logic operations using the similarities between the key contents and the retrievable contents corresponding to the retrieval keys, instead of the retrieval keys of the logic operation expression entered in the entering step, to calculate combined scores for the respective retrievable contents; and presenting, e.g., in step S7 shown in FIG. 6. contents best suited to the user from among the retrievable contents, based on the combined scores calculated in the combined score calculating step.

A program stored in a recording medium according to the present invention and a program according to the present invention also include steps which are identical to the steps of the above method of processing information.

FIG. 1 shows in block form a content presenting system according to an embodiment of the present invention.

As shown in FIG. 1, the content presenting system includes a content presenting apparatus 11 and a content server 12.

The content presenting apparatus 11 retrieves contents which are best suited to the user, i.e., preferred by the user, from a content DB (DataBase) 41 of the content server 12, and presents (recommends) the retrieved contents to the user.

The content represent information in various categories, including television and radio broadcast programs, movies, images such as photographs, music pieces (audio data), and various items of information including cooking, travel, shopping information from sites on the Internet. In the present embodiment, it is assumed that the contents represent music pieces and the content presenting apparatus 11 presents (retrieves) music pieces that the user wants to listen to. The contents stored in the content DB 41 of the content server 12 will hereinafter be referred to as "retrievable contents".

The content presenting apparatus 11 has an input unit 21 including a keyboard and a mouse (not shown) which are used by the user to enter a logic operation expression made up of a plurality of retrieval keys and logic operators between the retrieval keys.

The logic operators that can be entered by the user include "AND", "OR", "NOT", etc., for example. The retrieval keys that are entered by the user represent information for designating contents (music pieces), and may be the titles of music pieces, the names of the singers of music pieces, the names of music albums, etc. If a list of the titles of music pieces that are stored in a user content DB 23 is displayed on the display pane of an LCD (Liquid Crystal Display), not shown, then the list number (ID) of the list may be used as a retrieval key.

The user enters the title of a favorite music piece, among the music pieces stored in the user content DB 23, as a retrieval key through the input unit 21. The user may also enter (indicate) contents other than the contents that are owned by the user.

The input unit 21 supplies the retrieval keys entered by the user and the logic operation expression also entered by the user to a control unit 22.

The control unit 22 supplies the retrieval keys from the input unit 21 to a feature quantity extraction unit 24, and also supplies the logic operation expression from the input unit 21 to a combining unit 28.

The control unit 22 is also supplied with a list of retrievable contents that are sorted in the descending order of combined scores S (described later), from a sort unit 29. Based on the list of retrievable contents supplied from the sort unit 29, the control unit 22 controls an external I/F (InterFace) 30 to acquire the retrievable contents whose combined score S is the greatest (also referred to as "recommended contents") from the content DB 41 of the content server 12, to store the recommended contents in the user content DB 23, and to supply the recommended contents to a content reproduction unit 31 to reproduce (present) the recommended contents.

The user content DB 23 stores contents (music pieces) that the user has acquired so far. The contents stored in the user content DB 23 are supplied to the feature quantity extraction unit 24 or the content reproduction unit 31. The user content DB 23 can store contents acquired from the content server 12 through the external I/F 30 and can also store contents acquired through a driver, not shown, from a recording medium (removable medium) such as a DVD (Digital Versatile Disc), a semiconductor memory, or the like, for example.

The feature quantity extraction unit 24 acquires contents (hereinafter referred to as "key contents") designated by a retrieval key supplied from the control unit 22 from the user content DB 23, extracts a feature quantity of the key contents, and supplies the extracted feature quantity to a similarity calculating unit 26. Since the feature quantity extraction unit 24 are supplied with a plurality of retrieval keys from the control unit 22, the feature quantity extraction unit 24 extracts feature quantities of a plurality of key contents and supplies the extracted feature quantities to the similarity calculating unit 26.

The feature quantity extraction unit 24 supplies feature quantities of retrievable contents that are supplied from the content DB 41 through the external I/F 30 to a feature quantity DB 25. If the content DB 41 does not store feature quantities of retrievable contents, then the feature quantity extraction unit 24 can acquire retrievable contents themselves from the content DB 41 through the external I/F 30, extract feature quantities of the retrievable contents, and supply the extracted feature quantities to the feature quantity DB 25.

The feature quantity DB 25 stores the feature quantities of the retrievable contents supplied from the feature quantity extraction unit 24, and supplies the stored feature quantities to similarity calculating unit 26, if necessary.

Since contents represent music pieces in the present embodiment, the types of feature quantities of contents include tempo, mood, and the number of sounds, for example. Feature quantities are represented by numerical values ranging from 0 to 1, indicating the degrees of features. For example, tempos (feature quantities thereof) are represented by numerical values ranging from 0 to 1, indicating whether a music piece is of a slow tempo or a fast tempo. Moods (feature quantities thereof) are represented by numerical values ranging from 0 to 1, indicating whether a music piece is of a dark mood or a bright mood. The number of sounds (feature quantities thereof) are represented by numerical values ranging from 0 to 1, indicating whether a music piece is performed by a solo musical instrument or a number of musical instruments.

The types of feature quantities of contents are not limited to the above three types, but may be four or more types. Other types of feature quantities of contents may include melody, chord progression, etc.

The similarity calculating unit 26 is supplied with feature quantities of a plurality of key contents from the feature quantity extraction unit 24 and feature quantities of all retrievable contents from the feature quantity DB 25. The similarity calculating unit 26 calculates similarities between all key contents and retrievable contents, and supplies the calculated similarities to a score calculating unit 27.

Indexes representing similarities between key contents and retrievable contents may include the Euclidean distance between the vector of key contents and the vector of retrievable contents in a three-dimensional space having axes represented by tempo, mood, and the number of sounds.

Specifically, a similarity (distance) D between key contents and retrievable contents can be expressed according to the following equation (1):

$$D = \mathrm{sqrt}\{(\text{retrievable contents·tempo} - \text{key contents·tempo})^2 + (\text{retrievable contents·mood} -$$

key contents·mood)$^2$+(retrievable contents·the number of sounds−key contents·the number of sounds)$^2$} (1)

where the retrievable contents·tempo represents the value of a feature quantity of tempo of the retrievable contents, the retrievable contents·mood represents the value of a feature quantity of mood of the retrievable contents, the retrievable contents·the number of sounds represents the value of a feature quantity of the number of sounds of the retrievable contents, and sqrt represents square root ($\sqrt{\ }$).

In addition, as the similarity D between key contents and retrievable contents, it is not limited to the Euclidean distance, for example, an inner product of the vector of key contents and the vector of retrievable contents can be adopted.

If the total number of key contents supplied from the feature quantity extraction unit 24 is represented by n and the total number of retrievable contents supplied from the feature quantity DB 25 is represented by m (n, m are an integer of 2 or greater), then the similarity calculating unit 26 calculates m similarities D per key content, and supplies a total of n×m similarities D to the score calculating unit 27.

The score calculating unit 27 calculates scores s of key contents and retrievable contents from the similarities D between key contents and retrievable contents that are supplied from the similarity calculating unit 26, and supplies the calculated scores s to the combining unit 28. Therefore, the score calculating unit 27 calculates n×m scores s and supplies the calculated n×m scores s to the combining unit 28.

The score calculating unit 27 calculates a score s such that the score s is greater as the similarity D between key contents and retrievable contents is higher. If a distance expressed by the above equation (1) is used as a similarity D, then since a smaller distance represents a higher similarity, a score s can be calculated according to the following equation (2), for example:

$$s = 1 \div (D + \alpha) \quad (2)$$

where α represents a predetermined constant that is added to prevent the denominator from becoming zero even if the similarity D is zero (when key contents and retrievable contents are in full agreement with each other).

If an index representing a similarity such that as the index is greater, the similarity is also greater is used, then a similarity D may directly be used as a score s. In this case, the score calculating unit 27 may be dispensed with.

The combining unit 28 calculates a combined score S per retrievable content based on the n×m scores s supplied from the score calculating unit 27 and the logic operation expression supplied from the control unit 22. Specifically, the combining unit 28 performs logic operations using scores s of key contents and retrievable contents corresponding to retrieval keys, instead of the retrieval keys of the logic operation expression, and calculates a combined score S per retrievable content. Therefore, the combining unit 28 performs logic operations on n scores s for one retrievable content, and calculates combined scores S of m retrievable contents. The combining unit 28 supplies the combined scores S of m retrievable contents to the sort unit 29.

The sort unit 29 sorts the combined scores S of retrievable contents supplied from the combining unit 28 in the descending order, and supplies a list of retrievable contents whose combined scores S are sorted in the descending order to the control unit 22. Contents that are higher in order in the list of retrievable contents supplied from the sort unit 29, i.e., contents having greater combined scores S in the list, are more suited to the user, or better matches the preference of the user.

The external I/F 30 includes an ADSL (Asymmetric Digital Subscriber Line) modem, a LAN (Local Area Network) card, or the like, and functions as a communication interface with any of various networks such as the Internet. The external I/F 30 acquires retrievable contents or feature quantities of retrievable contents from the content DB 41 of the content server 12 through a network (not shown), and supplies the acquired retrievable contents or feature quantities of retrievable contents to the user content DB 23 or the feature quantity extraction unit 24, under the control of the control unit 22.

The content reproduction unit 31 reproduces contents supplied from the user content DB 23 under the control of the control unit 22. A music piece reproduced by the content reproduction unit 31 is output from speakers (not shown).

The content server 12 incorporates therein the content DB 41 which stores many contents (music pieces). The content server 12 provides (supplies) contents or feature quantities of contents stored in the content DB 41 in response to requests from users that access the content server 12 through the network.

With the contents presenting system shown in FIG. 1 constructed as described above, the user enters a logic operation expression made up of a plurality of retrieval keys indicative of contents and logic operators between the retrieval keys, through the input unit 21.

The feature quantity extraction unit 24 acquires contents (key contents) corresponding to retrieval keys supplied from the control unit 22 from the user content DB 23, extracts feature quantities of the key contents, and supplies the extracted feature quantities to the similarity calculating unit 26. The similarity calculating unit 26 calculates similarities D between all key contents and retrievable contents, using the feature quantities of the key contents supplied from the feature quantity extraction unit 24 and the feature quantities of the retrievable contents stored in the content DB 41 of the content server 12 and supplied from the feature quantity DB 25.

The score calculating unit 27 converts the similarities D between key contents and retrievable contents into scores s, and the combining unit 28 combines scores s per retrievable content, i.e., calculates a combined score S, based on the logic operation according to the logic operation expression entered through the input unit 21. The sort unit 29 supplies the control unit 22 with a list of retrievable contents that are sorted in the descending order of combined scores S. The control unit 22 controls the external I/F 30 to acquire contents having the greatest combined score S, i.e., contents highest in the order on the list, from the content DB 41 of the content server 12, to store the acquired contents in the user content DB 23, and to reproduce the acquired contents on the content reproduction unit 31.

In FIG. 1, only one content server 12 is connected to the content presenting apparatus 11. However, the content presenting apparatus 11 may be connected to a plurality of servers for acquiring contents or feature quantities of contents that are stored in the servers.

Data calculated in the various components of the content presenting apparatus 11 will be described in detail below.

It is assumed that the user enters a logic operation expression (retrieval keys and logic operators) representing "content $KB_1$ AND content $KB_2$ AND . . . content $KB_n$". The content $KB_1$, content $KB_2$, . . . , and content $KB_n$ that are entered are retrieval keys and also titles of content (key content) stored in the user content DB 23. The logic operator "AND" is entered between adjacent ones of the retrieval keys.

The feature quantity extraction unit 24 reads n content $KB_1$ through $KB_n$ from the user content DB 23, extracts feature quantities from the content $KB_1$ through $KB_n$, and supplies the extracted feature quantities to the similarity calculating unit 26.

FIG. 2 shows by way of example feature quantities of key content (contents $KB_1$ through $KB_n$) extracted by the feature quantity extraction unit 24 for retrieval keys supplied from the control unit 22.

As shown in FIG. 2, the tempo of the content $KB_n$ is 0.5, the mood of the content $KB_1$ is 0.3, and the number of sounds of the content $KB_1$ is 0.6. The tempo of the content $KB_2$ is 0.9, the mood of the content $KB_2$ is 0.4, and the number of sounds of the content $KB_2$ is 0.2. The tempo of the content $KB_n$ is 0.2, the mood of the content $KB_n$ is 0.8, and the number of sounds of the content $KB_n$ is 0.5. Data about the content $KB_3$ through $KB_{1-m}$ are omitted from illustration in FIG. 2.

The feature quantities of the key content (contents $KB_1$ through $KB_n$) shown in FIG. 2 are supplied from the feature quantity extraction unit 24 to the similarity calculating unit 26. The similarity calculating unit 26 is also supplied with feature quantities of all retrievable contents.

FIG. 3 shows by way of example feature quantities of all retrievable contents that are stored in the feature quantity DB 25.

As shown in FIG. 3, the tempo of the content $A_1$ stored in the feature quantity DB 25 is 0.4, the mood of the content $A_1$ is 0.2, and the number of sounds of the content $A_1$ is 0.8. The tempo of the content $A_2$ stored in the feature quantity DB 25 is 0.3, the mood of the content $A_2$ is 0.5, and the number of sounds of the content $A_2$ is 0.5. The tempo of the content $A_m$ stored in the feature quantity DB 25 is 0.4, the mood of the content $A_m$ is 0.6, and the number of sounds of the content $A_m$ is 0.1. Data about the contents $A_3$ through $A_{m-1}$ are omitted from illustration in FIG. 3.

The similarity calculating unit 26 calculates similarities D between key contents and retrievable contents with respect to all key contents. As regards the data of the feature quantities of key contents and retrievable contents shown in FIGS. 2 and 3, the similarity calculating unit 26 calculates a similarity $D_{1,1}$ between the key content $KB_1$ and the retrievable content $A_1$, a similarity $D_{1,2}$ between the key content $KB_n$ and the retrievable content $A_2$, . . . , and a similarity $D_{1,m}$ between the key content $KB_1$ and the retrievable content $A_m$. Similarly, the similarity calculating unit 26 calculates similarities $D_{i,j}$ (i=2 through n, j=1 through m) between the key content $KB_2$ through $KB_n$ and the retrievable contents $A_1$ through $A_m$.

More specifically, the similarity $D_{1,1}$ between the key content $KB_1$ and the retrievable content $A_1$ is calculated according to the above equation (1), as follows:

The similarity $D_{1,1}$ between the key content $KB_1$ and
the retrievable content $A_1$=sqrt{(content
$A_1$·tempo−the content $KB_1$·tempo)$^2$+(content
$A_1$·mood−the content $KB_n$·mood)$^2$+(content
$A_1$·the number of sounds−the content $KB_1$·the
number of sounds)$^2$}

=sqrt{(0.4−0.5)2+(0.2−0.3)2+(0.8−0.6)$^2$}

=sqrt{0.06}

≈0.245

At this time, a score $s_{1,1}$ of the content $KB_1$ and the content $A_1$, which is calculated by the score calculating unit 27, is determined according to the above equation (2), as follows:

The score $s_{1,1}$ of the content $KB_n$ and the content
$A_1$=1÷(0.245+0.1)≈2.9

In the above calculation, the constant α in the equation (2) is 0.1.

FIG. 4 shows the manner in which the score calculating unit 27 calculates scores $s_{i,j}$ (i=1 through n, j=1 through m) of content $KB_i$ and content $A_j$ from the similarities between the content (key content) $KB_i$ and the content (retrievable content) $A_j$.

As shown in FIG. 4, as regards the content $KB_1$, the score calculating unit 27 calculates a score $s_{1,1}$ of the content $KB_1$ and the content $A_1$, a score $s_{1,2}$ of the content $KB_n$ and the content $A_2$, . . . , and a score $s_{1,m}$ of the content $KB_1$ and the content $A_m$, thereby producing m scores $s_{1,1}$ through $s_{1,m}$.

As regards the content $KB_2$, the score calculating unit 27 calculates a score $s_{2,1}$ of the content $KB_2$ and the content $A_1$, a score $s_{2,2}$ of the content $KB_2$ and the content $A_2$, . . . , and a score $s_{2,m}$ of the content $KB_2$ and the content $A_m$, thereby producing m scores $s_{2,1}$ through $s_{2,m}$.

Likewise, the score calculating unit 27 produces m scores as regards each of the contents $KB_3$ through $KB_n$.

The score calculating unit 27 supplies the scores $s_{i,j}$ of the content (key content) $KB_i$ and the content $A_j$ with respect to all the content $KB_i$ to the combining unit 28.

The combining unit 28 normalizes the scores $s_{i,j}$ to set a maximum value of the scores $s_{i,j}$ for the respective content $KB_i$ to 1 in order to equalize the effects that the respective content (key content) $KB_i$ have on a combined score S to be calculated subsequently. The normalized scores $s_{i,j}$ are denoted by $s'_{i,j}$.

The combining unit 28 also calculates combined scores S (combined scores $S_j$ of the content $A_j$) of the respective retrievable contents for the retrieval keys and the logic operators entered through the input unit 21, as shown in FIG. 5.

Specifically, the content $KB_i$ of retrieval keys entered through the input unit 21 are converted into scores $s'_{i,j}$ of the content $KB_i$ and the content $A_j$, and a combined score $S_j$ of the content $A_j$ is calculated according to an equation where the logic operators AND, OR, and NOT are converted respectively into multiplication (×), addition (+), and subtraction (−).

Specifically, when the logic operation expression "content $KB_1$ AND content $KB_2$ AND . . . AND content $KB_n$" is entered, the combined score $S_1$ of the content $A_1$ is determined as the score $s'_{1,1}$ of the content $KB_1$ and the content $A_1$×the score $s'_{2,1}$ of the content $KB_2$ and the content $A_1$× . . . ×the score $s'_{n,1}$ of the content $KB_n$ and the content $A_1$.

The combined score $S_2$ of the content $A_2$ is determined as the score $s'_{1,2}$ of the content $KB_n$ and the content $A_2$×the score $s'_{2,2}$ of the content $KB_2$ and the content $A_2$× . . . ×the score $s'_{n,2}$ of the content $KB_n$ and the content $A_2$.

Similarly, the combined scores $S_3$ through $S_m$ are determined with respect to the content $A_3$ through $A_m$.

The combined scores $S_1$ through $S_m$ are determined with respect to all the retrievable contents (the content $A_1$ through $A_m$) that are stored in the content DB 41 of the content server 12 in the manner described above.

The sort unit 29 sorts the combined scores $S_1$ through $S_m$ in the descending order, and presents the retrievable content (recommended content) having the greatest combined score S to the user. Specifically, the recommended contents are downloaded from the content DB 41 of the content server 12, stored in the user content DB 23, supplied to the content reproduction unit 31, and reproduced thereby.

The recommended contents may not be limited to a single one having the greatest combined score S, but may be a desired number of contents having large combined scores S, which may be presented (reproduced) in the descending order of combined scores S.

The content presenting apparatus 11 may not download the recommended contents from the content DB 41 of the content server 12 and reproduce the downloaded recommended contents, but may display a list of retrievable contents supplied from the sort unit 29 on the display, leaving it up to the user to decide whether the contents are to be reproduced or not.

A content presenting process performed by the content presenting system 11 will be described below with reference to a flowchart shown in FIG. 6.

In step S1, the input unit 21 determines whether a logic operation expression made up of a plurality of retrieval keys and logic operators is entered by the user or not. The processing of step S1 is repeated until it is determined that a logic operation expression is entered in step S1.

If it is determined that a logic operation expression is entered in step S1, then control goes to step S2 in which the control unit 22 supplies the retrieval keys in the logic operation expression supplied from the input unit 21 to the feature quantity extraction unit 24. In step S2, the feature quantity extraction unit 24 acquires contents (key contents) designated by the retrieval keys from the user content DB 23, extracts feature quantities of the key contents, and supplies the extracted feature quantities to the similarity calculating unit 26. Then, control goes to step S3.

In step S3, the similarity calculating unit 26 acquires feature quantities of all the retrievable contents from the feature quantity DB 25. Then, control goes to step S4.

In step S4, the similarity calculating unit 26 and the score calculating unit 27 perform a score calculating process. Then, control goes to step S5. In the score calculating process, scores $s_{i,j}$ of content $KB_i$ and the content $A_j$ are determined in the manner described above with reference to FIG. 4. Details of the score calculating process will be described later with reference to FIG. 7.

In step S5, the combining unit 28 normalizes the scores $s_{i,j}$ for the respective content $KB_i$, i.e., determines scores $s'_{i,j}$. Then, control goes to step S6.

In step S6, the combining unit 28 performs logic operations on the scores $s'_{i,j}$ according to the logic operation expression supplied from the control unit 22, and calculates combined scores S for the respective retrievable content (combined scores $S_j$ of the content $A_j$ shown in FIG. 5). The combining unit 28 supplies the combined scores S to the sort unit 29. Then, control goes to step S7.

In step S7, the sort unit 29 sorts the retrievable contents in the descending order of the combined scores S calculated in step S6, and supplies a resultant list of the retrievable contents to the control unit 22. In step S7, the control unit 22 controls the external I/F 30 to acquire the retrievable contents (recommended contents) having the greatest combined score from the content DB 41 of the content server 12, based on the list of the retrievable contents supplied from the sort unit 29, and stores the acquired retrievable contents in the user content DB 23. The control unit 22 also supplies the recommended contents from the user content DB 23 to the content reproduction unit 31, which reproduces the recommended contents. The content presenting process is now put to an end.

The score calculating process in step S4 shown in FIG. 6 will be described in detail below with reference to FIG. 7.

In step S21, the similarity calculating unit 26 sets variables i, j for counting the number of key contents and the number of retrievable contents to 1. Then, control goes to step S22.

In step S22, the similarity calculating unit 26 calculates similarities $D_{i,j}$ between content (key content) $KB_i$ and content (retrievable content) $A_j$ according to the equation (1), and supplies the calculates similarities $D_{i,j}$ to the score calculating unit 27. Then, control goes to step S23.

In step S23, the similarity calculating unit 26 determines whether the variable j is of the same value as the total number m of retrievable contents or not. If it is determined in step S23 that the variable j is not of the same value as the total number m of retrievable contents, i.e., if scores $s_{i,j}$ of the content $KB_i$ and all retrievable contents $A_j$ are not calculated, then control goes to step S24 in which the similarity calculating unit 26 increments the variable j by 1. Then, control goes back to step S22.

If it is determined in step S23 that the variable j is of the same value as the total number m of retrievable contents, i.e., if scores $s_{i,j}$ of the content $KB_i$ and all retrievable content $A_j$ are calculated, then control goes to step S25.

In step S25, the similarity calculating unit 26 determines whether the variable i is of the same value as the total number n of key contents or not.

If it is determined in step S25 that the variable i is not of the same value as the total number n of key contents, i.e., if scores $s_{i,j}$ are not calculated with respect to all key contents, then control goes to step S26 in which the similarity calculating unit 26 increments the variable i by 1. Then, control goes back to step S22.

If it is determined in step S25 that the variable i is of the same value as the total number n of key contents, i.e., if scores $s_{i,j}$ are calculated with respect to all key contents, then control goes to step S27.

In steps S27, S29 through S32, the score calculating unit 27, instead of the similarity calculating unit 26, performs the same processing as in steps S21, S23 through S26.

In step S28, the score calculating unit 27 calculates scores $s_{i,j}$ of the content $KB_i$ and the content $A_j$ from the similarities $D_{i,j}$ between the content $KB_i$ and the content $A_j$ which are supplied from the similarity calculating unit 26, according to the equation (2), and supplies the calculated scores $s_{i,j}$ to the combining unit 28. Then, control goes to step S29.

Therefore, in steps S27 through S32, scores s of a single key content with respect to all the retrievable contents are calculated, and the calculation of scores s is repeated with respect to all the key contents. After the scores $s_{i,j}$ of the content $KB_i$ and the content $A_j$ are calculated, control returns to the main routine shown in FIG. 6.

According to the content presenting process shown in FIG. 6, contents which best match the preference of the user, i.e., which have the greatest combined score $S_j$, can be detected from among the retrievable contents according to the logic operation expression entered through the input unit 21, and presented to the user. Therefore, the contents which are best suited to the user can be presented.

According to the content presenting process, the user enters a logic operation expression made up of a plurality of retrieval keys and logic operators representing relations (logic operations) between the retrieval keys through the input unit 21. Therefore, it is possible to present contents which are closer to the preference of the user, i.e., which are more accurate, than if only one retrieval key (key content) is designated and contents best suited to the user are presented based on the one retrieval key. Thus, the accuracy of retrieved contents is increased.

When the user enters a logic operation expression through the input unit 21, if the user can add its own preference as weights to a plurality of retrieval keys, then contents that are better suited to the preference of the user can be retrieved. Therefore, the accuracy of retrieved contents is further increased.

Figure 8:
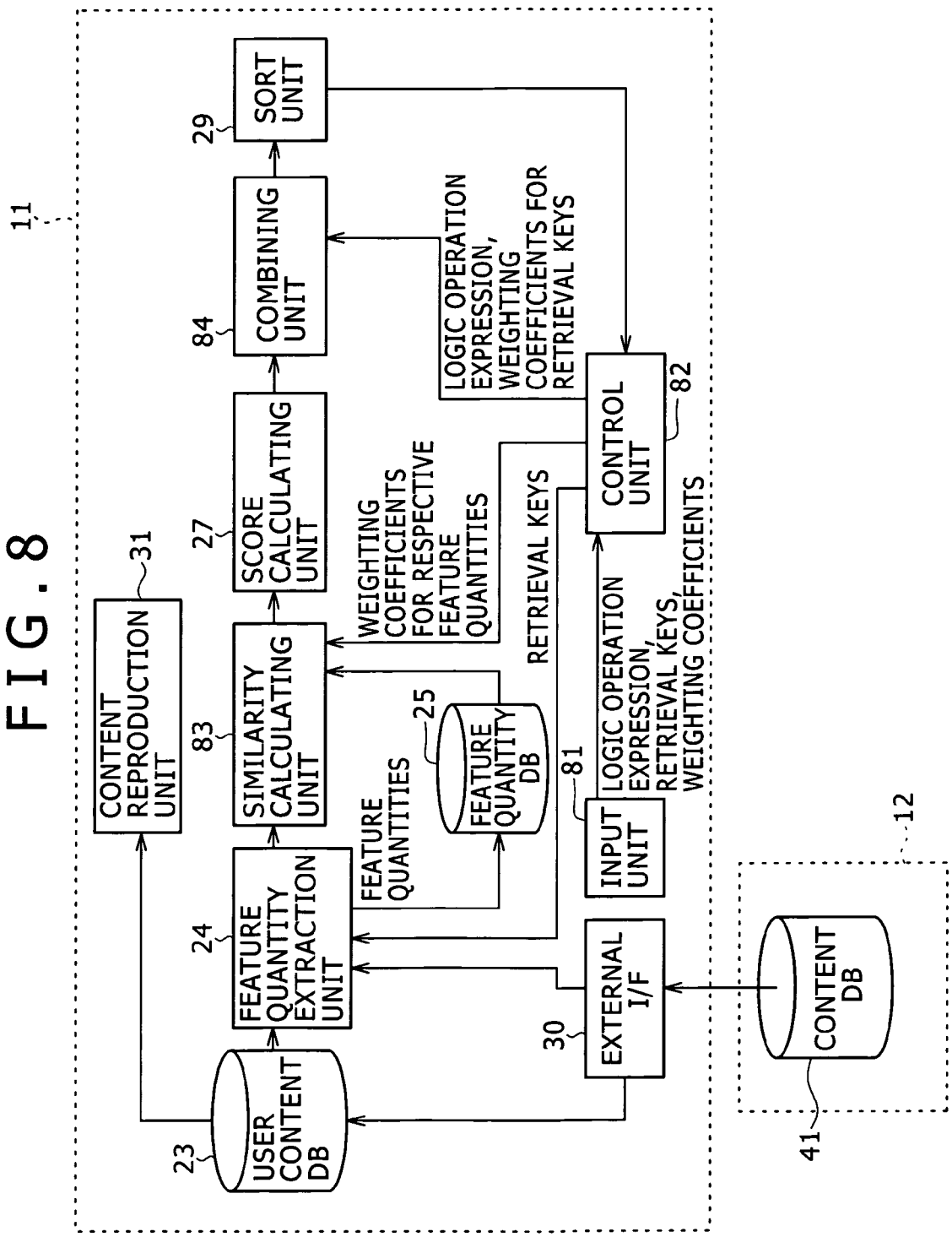
FIG. 8 is a block diagram of a content presenting system according to another embodiment of the present invention.

FIG. 8 shows in block form a content presenting system according to another embodiment of the present invention, the content presenting system being capable of designating weighting coefficients for retrieval keys and feature quantities of content. Those parts of the content presenting system shown in FIG. 8 which are identical to those shown in FIG. 1 are denoted by identical reference characters, and will not be described in detail below.

The content presenting system 11 shown in FIG. 8 has an input unit 81, a controller 82, a similarity calculating unit 83, and a combining unit 84 which are employed in place of the input unit 21, the control unit 22, the similarity calculating unit 26, and the combining unit 28, respectively, shown in FIG. 1.

The input unit 81 is supplied with a logic operation expression entered by the user and also with weighting coefficients for retrieval keys and weighting coefficients for feature quantities entered by the user, as with the first embodiment.

For example, the user enters a logic operation expression, weighting coefficients for retrieval keys, and weighting coefficients for feature quantities, through the input unit 81, as follows:

a logic operation expression: (content $KB_1$ OR content $KB_2$) AND content $KB_3$;
a weighting coefficient for content $KB_1$: 1.0;
a weighting coefficient for content $KB_2$: 0.5;
a weighting coefficient for content $KB_3$: 1.0;
a weighting coefficient for tempo: 0.5;
a weighting coefficient for mood: 1.0; and
a weighting coefficient for the number of sounds: 0.5.

These entered logic operation expression and weighting coefficients show that the user attaches more importance to the content $KB_n$, $KB_3$ (whose weighting coefficients are 1.0) than the content $KB_2$ (whose weighting coefficient is 0.5) with respect to the retrieval keys, and also attaches more importance to the mood (whose weighting coefficient is 1.0) than the tempo and the number of sounds (whose weighting coefficients are 0.5). The content presenting apparatus 11 retrieves music pieces which reflect the above preference of the user.

The input unit 81 supplies the retrieval keys, the logic operation expression made up of the retrieval keys and the logic operators between the retrieval keys, the weighting coefficients for the retrieval keys, and the weighting coefficients for the feature quantities, to the controller 82.

The controller 82 supplies the weighting coefficients for the feature quantities supplied from the input unit 81 to the similarity calculating unit 83. The controller 82 also supplies the weighting coefficients for the retrieval keys supplied from the input unit 81 to the combining unit 84.

The controller 82 also performs the same processing operation as described above with respect to the first embodiment. Therefore, the feature quantity extraction unit 24 is supplied with the retrieval keys, and the combining unit 84 is supplied with the logic operation expression and the weighting coefficients for the retrieval keys.

The similarity calculating unit 83 is supplied with feature quantities of a plurality of key content corresponding to the retrieval keys from the feature quantity extraction unit 24, as with the first embodiment. The similarity calculating unit 83 is also supplied with feature quantities of all the retrievable contents from the feature quantity DB 25.

The similarity calculating unit 83 is also supplied with the weighting coefficients for the feature quantities from the controller 82, as described above. Specifically, the weighting coefficients for tempo, mood, and the number of sounds are supplied from the controller 82 to the similarity calculating unit 83.

Using the feature quantities of contents that are weighted by the weighting coefficients supplied from the controller 82, the similarity calculating unit 83 calculates similarities between key content and retrieval content with respect to all the key contents, and supplies the calculated similarities to the score calculating unit 27.

Specifically, the similarity calculating unit 83 calculates a similarity D between key content and retrievable content according to the following equation (3), rather than the above equation (1):

$$D = \mathrm{sqrt}\{((\text{retrievable content·tempo} - \text{key content·tempo}) \times \text{weighting coefficient for tempo})^2 + ((\text{retrievable content·mood} - \text{key content·mood}) \times \text{weighting coefficient for mood})^2 + ((\text{retrievable content·the number of sounds} - \text{key content·the number of sounds}) \times \text{weighting coefficient for the number of sounds})^2\} \quad (3)$$

For example, if the weighting coefficient for tempo, the weighting coefficient for mood, and the weighting coefficient for the number of sounds are 0.5, 1.0, and 0.5, respectively, then a similarity $D_{1,1}$ between content $KB_1$ and content $A_1$ described above with reference to FIGS. 2 and 3 is calculated as follows:

Similarity $D_{1,1}$ between content $KB_1$ and content
$A_1 = \mathrm{sqrt}\{(\text{content } A_1\text{·tempo} - \text{content } KB_1\text{·tempo}) \times \text{weighting coefficient for tempo}^2\} + ((\text{content } A_1\text{·mood} - \text{content } KB_1\text{·mood}) \times \text{weighting coefficient for mood})^2 + ((\text{content } A_1\text{·the number of sounds} - \text{content } KB_1\text{·the number of sounds}) \times \text{weighting coefficient for the number of sounds})^2\}$ $= \mathrm{sqrt}\{((0.4-0.5) \times 0.5)^2 + ((0.2-0.3) \times 1.0)^2 + ((0.8-0.6) \times 0.5)^2\}$ $= \mathrm{sqrt}\{((-0.5)^2 + (-0)^2 + (0.2 \times 0.5)^2\}$ $\approx 1.125$ At this time, a score $s_{1,1}$ of the content $KB_n$ and the content $A_1$, which is calculated by the score calculating unit 27, is determined according to the above equation (2) ($\alpha = 0.1$), as follows:

Score $s_{1,1}$ of content $KB_1$ and content $A_1 = 1 \div (1.125 + 0.1)$
$\approx 0.8$ The combining unit 84 is supplied with the score $s_{i,j}$ of the content $KB_i$ and the content $A_j$ from the score calculating unit 27, and also with the logic operation expression and the weighting coefficients for the retrieval keys from the controller 82.

The combining unit 84 calculates combined scores for the respective retrievable contents, using the retrieval keys that are weighted by the weighting coefficients. Specifically, the combining unit 84 performs logic operations using the score $s_{i,j}$ of the content $KB_i$ and the content $A_j$, to which weights corresponding to the retrieval keys are applied, rather than the retrieval keys of the logic operation expression, calculating combined scores for the respective retrievable contents, i.e., combined scores $S_j$ for the content $A_j$.

With the content presenting system shown in FIG. 8 constructed as described above, the user enters a logic operation expression made up of a plurality of retrieval keys indicative of contents and logic operators between the retrieval keys, weighting coefficients for retrieval keys, and weighting coefficients for feature quantities through the input unit 81. Thus, the input unit 81 is supplied with weights depending on the preference of the user with respect to retrieval keys and feature quantities.

The feature quantity extraction unit 24 acquires content (key content) designated by retrieval keys supplied from the controller 82 from the user content DB 23, extracts feature quantities of the key contents, and supplies the extracted feature quantities to the similarity calculating unit 83. The similarity calculating unit 83 calculates similarities D between key content and retrievable content, using the feature quantities of the contents which are weighted by the weighting coefficients corresponding to the feature quantities supplied from the controller 82, and supplies the calculated similarities D to the score calculating unit 27.

The score calculating unit 27 converts the similarities D between key content and retrievable content into scores s, and the combining unit 84 combines scores s for the respective retrievable contents, i.e., calculates combined scores S, according to the logic operation expression and the weighting coefficients for the retrieval keys entered through the input unit 81. The sort unit 29 supplies the controller 82 with a list of retrievable contents that are sorted in the descending order of combined scores S. The controller 82 controls the external I/F 30 to acquire contents having the greatest combined score S, i.e., contents highest in order on the list, from the content DB 41 of the content server 12, to store the acquired contents in the user content DB 23, and to reproduce the acquired contents on the content reproduction unit 31.

Figure 9:
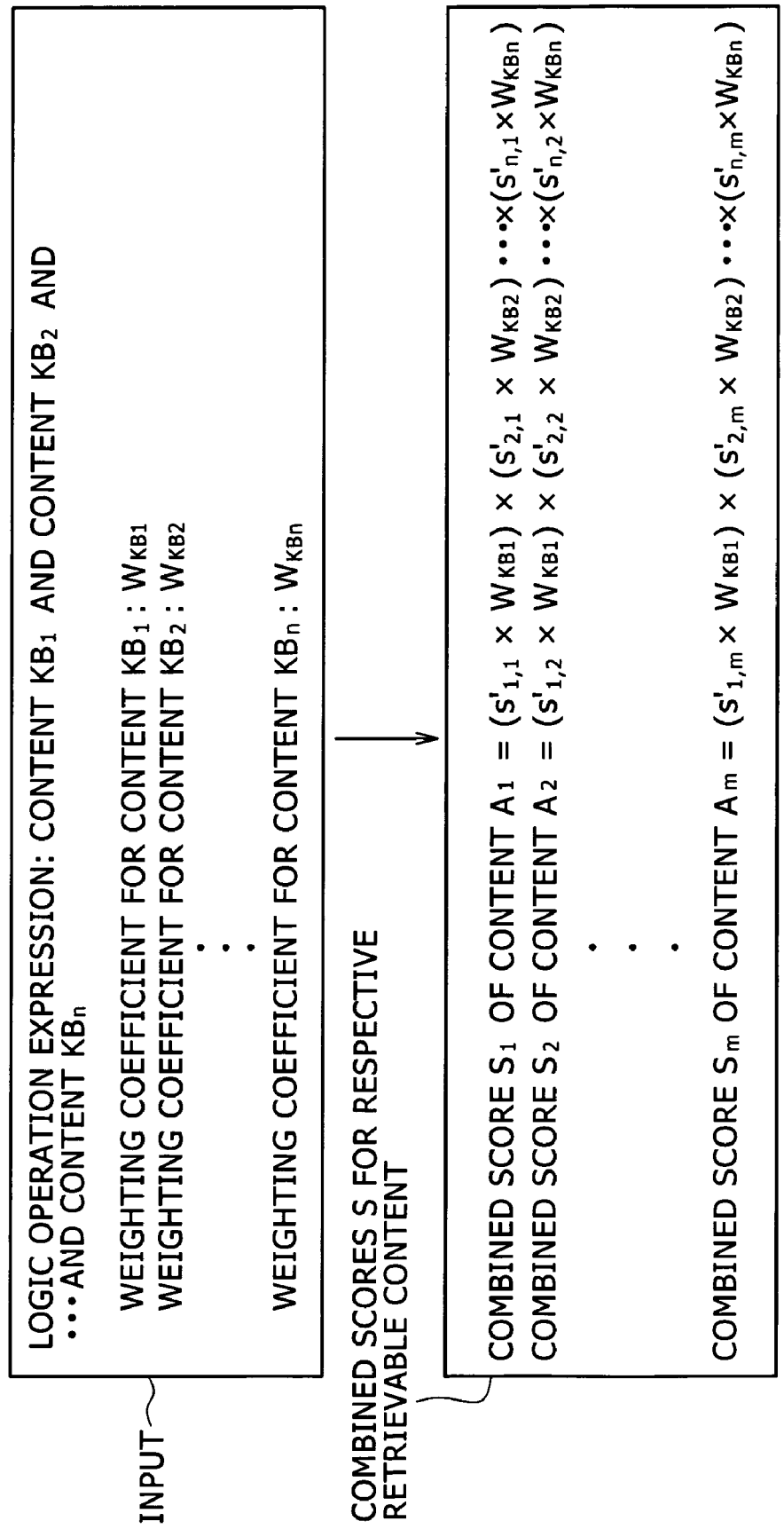
FIG. 9 is a diagram illustrative of how scores are combined by a score combiner of the content presenting system shown in FIG. 8.

FIG. 9 shows the manner in which combined scores S are calculated if weighting coefficients for retrieval keys, in addition to a logic operation expression made up of a plurality of retrieval keys and logic operators, are entered through the input unit 81 by the user. The logic operation expression entered by the user is the same as the logic operation expression shown in FIG. 5.

As shown in FIG. 9, the logic operation expression "content $KB_1$ AND content $KB_2$ AND . . . content $KB_n$" is entered through the input unit 81 by the user. Furthermore, weighting coefficients $W_{KB1}$, $W_{KB2}$, . . . , $W_{KBn}$ respectively for the retrieval keys of the content $KB_1$, $KB_2$, . . . , $KB_n$ are also entered through the input unit 81 by the user.

Combined scores $S_j$ of the content $A_j$ can be determined by multiplying scores $s'_{i,j}$, which are multiplied by the weighting coefficients $W_{KBi}$ for the content $KB_i$, by each other according to the logic operator AND.

Specifically, as shown in FIG. 9, a combined score $S_1$ of a content $A_1$ is determined as (score $s'_{1,1}$ of content $KB_n$ and content $A_1$×weighting coefficient $W_{KB1}$ for content $KB_1$)×(score $s'_{2,1}$ of content $KB_2$ and content $A_1$×weighting coefficient $W_{KB2}$ for content $KB_2$)× . . . ×(score $s'_{n,1}$ of content $KB_n$ and content $A_1$×weighting coefficient $W_{KBn}$ for content $KB_n$).

A combined score $S_2$ of a content $A_2$ is determined as (score $s'_{1,2}$ of content $KB_n$ and content $A_2$×weighting coefficient $W_{KB1}$ for content $KB_1$)×(score $s'_{2,2}$ of content $KB_2$ and content $A_2$×weighting coefficient $W_{KB2}$ for content $KB_2$)× . . . ×(score $s'_{n,2}$ of content $KB_n$ and content $A_2$×weighting coefficient $W_{KBn}$ for content $KB_n$).

Similarly, the combined scores $S_3$ through $S_m$ wherein weights of retrieval keys are taken into account are determined with respect to the content $A_3$ through $A_m$.

A process of calculating combined scores S when a combining sequence of logic operations is designated by placing certain logic operations between parentheses in a logic operation expression through the input unit 81 will be described below.

Figure 10:
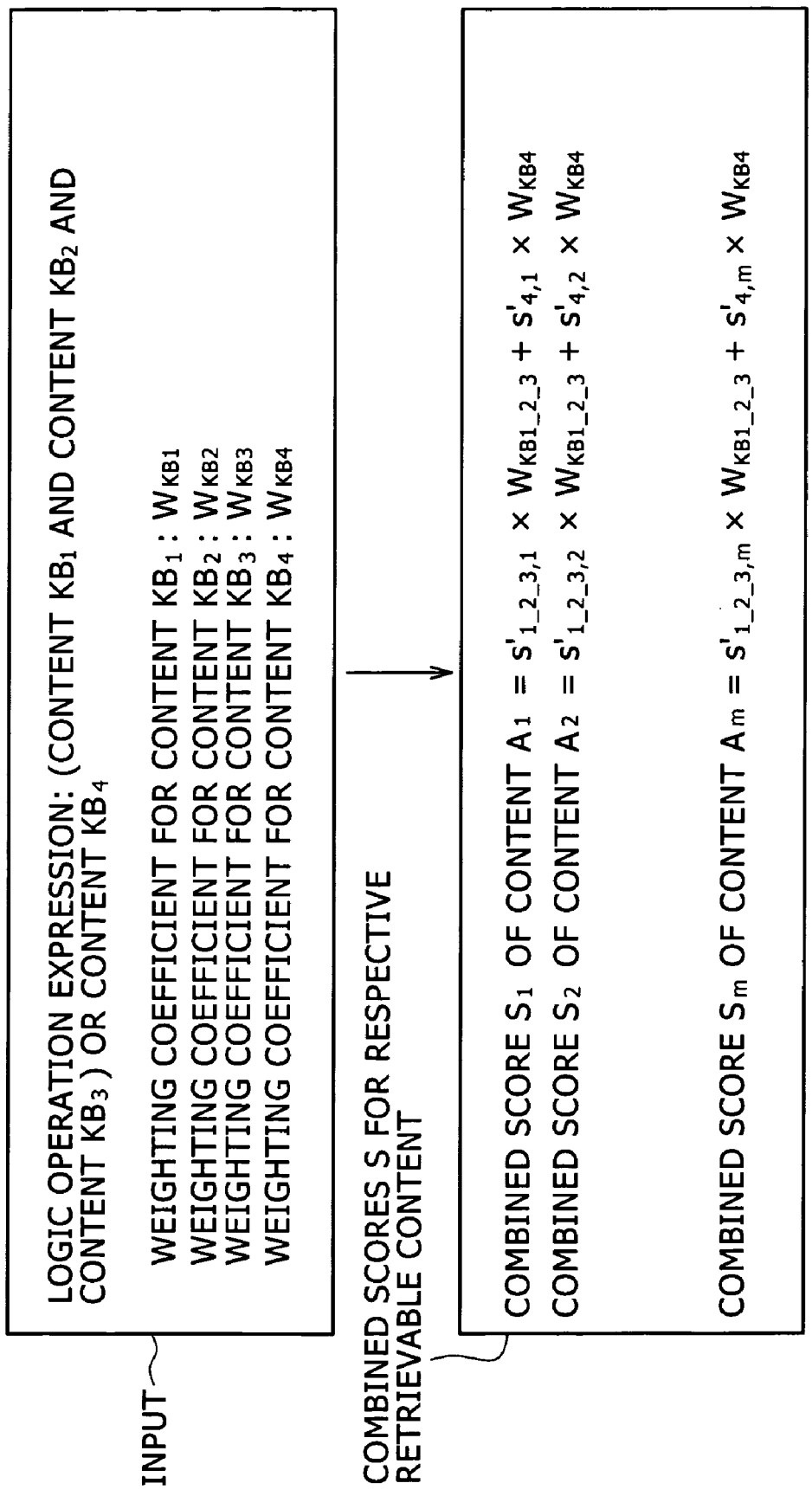
FIG. 10 is a diagram illustrative of how scores are combined by a score combiner of the content presenting system shown in FIG. 8.

It is assumed that a logic operation expression and weighting coefficients for respective retrieval keys are entered through the input unit 81 as shown in FIG. 10, for example.

Specifically, the user enters the logic operation expression "(content $KB_n$ AND content $KB_2$ AND content $KB_3$) OR content $KB_4$" through the input unit 81. The user also enters the weighting coefficients $W_{KB1}$ through $W_{KB4}$ for the respective content $KB_1$ through $KB_4$ through the input unit 81.

When the logic operation expression and the weighting coefficients are thus entered, the combining unit 84 performs the logic operations between the parentheses first in order to properly refine the logic operation expression, i.e., to reflect the weights for the respective retrievable keys in the retrieved contents. If there are a plurality of sets of parentheses, then logic operations between nested parentheses are performed first.

Therefore, the combining unit 84 first calculates scores $S_{1\_2\_3,j}$ of (content $KB_1$ AND content $KB_2$ AND content $KB_3$). Specifically, the combining unit 84 calculates the following equations:

$$s_{1\_2\_3,1} = s_{1,1} \times s_{2,1} \times s_{3,1}$$

$$s_{1\_2\_3,2} = s_{1,2} \times s_{2,2} \times s_{3,2}$$

$$\vdots$$

$$s_{1\_2\_3,m} = s_{1,m} \times s_{2,m} \times s_{3,m}$$

The scores $S_{1\_2\_3,j}$ of (content $KB_n$ AND content $KB_2$ AND content $KB_3$) which are obtained by calculating $s_{1,j} \times s_{2,j} \times s_{3,j}$ are possibly greater or smaller than the score $s_{4,j}$ of the content $KB_4$ depending on the value of the score $s_{1,j}$, $s_{2,j}$, $s_{3,j}$. In this case, (content $KB_1$ AND content $KB_2$ AND content $KB_3$) and the content $KB_4$ cannot be processed on an equal basis.

The combining unit 84 determines scores $s'_{1\_2\_3,j}$ by normalizing the scores $S_{1\_2\_3,j}$ with the maximum value of the scores $S_{1\_2\_3,1}$ through $S_{1\_2\_3,m}$ being set to 1. Similarly, normalized scores $s'_{i,j}$ are determined with respect to the scores $s_{i,j}$ of the content $KB_4$. Thus, the scores $s'_{1\_2\_3,j}$ of (content $KB_1$ AND content $KB_2$ AND content $KB_3$) and the scores $s'_{4,j}$ of the content $KB_4$ can be ORed on an equal basis.

Then, the combining unit 84 determines a weighting coefficient $W_{KB1\_2\_3}$ for the scores $s'_{1\_2\_3,j}$. The weighting coefficient $W_{KB1\_2\_3}$ can be determined by averaging the weighting coefficients $W_{KB1}$ through $W_{KB3}$, i.e., $W_{KB1\_2\_3} = (W_{KB1} \times W_{KB2} \times W_{KB3})/3$.

The combining unit 84 processes (adds) the scores $s'_{1\_2\_3,j}$ multiplied by the weighting coefficient $W_{KB1\_2\_3}$ and the score $s'_{4,j}$ multiplied by the weighting coefficient $W_{KB4}$ according to the logic operator OR, thereby calculating combined scores S for the respective retrievable contents.

Specifically, the combined score $S_1$ of the content $A_1$ is determined as the score $s'_{1\_2\_3,1} \times W_{KB1\_2\_3} + s'_{4,j} \times W_{KB4}$.

The combined score $S_2$ of the content $A_2$ is determined as the score $s'_{1\_2\_3,2} \times W_{KB1\_2\_3} + s'_{4,2} \times W_{KB4}$.

Similarly, as regards the content $A_3$ through $A_m$, a priority sequence (combined sequence) is designated for logic operations between retrieval keys, and combined scores $S_3$ through $S_m$ wherein weights of retrieval keys are taken into account are determined.

A content presenting process performed by the content presenting apparatus 11 when the logic operation expression and the weighting coefficients shown in FIG. 10 are entered through the input unit 81 will be described below with reference to a flowchart shown in FIG. 11.

In step S51, the input unit 21 determines whether a logic operation expression and weighting coefficients for respective retrieval keys are entered by the user or not. The processing of step S51 is repeated until it is determined that a logic operation expression and weighting coefficients for respective retrieval keys are entered in step S51. If it is determined that a logic operation expression and weighting coefficients for respective retrieval keys are entered, then control goes to step S52.

Steps S52 through S54 are identical to steps S2 through S4 shown in FIG. 6 and will not be described in detail below. Details of the score calculating process in step S54 are identical to those shown in FIG. 7. If weighting coefficients for feature quantities are also entered in step S51, then the differences between the feature quantities of the content $KB_i$ and the content $A_j$ are multiplied by the corresponding weighting coefficients for the feature quantities in the calculation of the similarities $D_{i,j}$ between the content $KB_i$ and the content $A_j$ in step S22 shown in FIG. 7.

After step S54, control goes to step S55 in which the combining unit 84 calculates scores $s_{1\_2\_3,j}$ of (content $KB_1$ AND content $KB_2$ AND content $KB_3$) and also calculates scores $s'_{1\_2\_3,j}$ by normalizing the scores $s_{1\_2\_3,j}$. In step S55, the combining unit 84 also determines a weighting coefficient $W_{KB1\_2\_3}$ for the scores $s'_{1\_2\_3,j}$ from an average value of the weighting coefficients $W_{KB1}$ through $W_{KB3}$.

In step S55, the combining unit 82 determines scores $s'_{4,j}$ by normalizing the score $s_{4,j}$ of the content $KB_4$. Then, control goes to step S56.

In step S56, the combining unit 84 processes (adds) the scores $s'_{1\_2\_3,j}$ multiplied by the weighting coefficient $W_{KB1\_2\_3}$ and the score $s'_{4,j}$ multiplied by the weighting coefficient $W_{KB4}$ according to the logic operator OR, thereby calculating combined scores S for the respective retrievable contents, i.e., combined scores $S_j$ for the content $A_j$ shown in FIG. 10. Then, control goes to step S57.

In step S57, the same processing as in step S7 shown in FIG. 7 is performed. Specifically, the sort unit 29 sorts the retrievable contents in the descending order of the combined scores $S_j$ calculated in step S56, and supplies a resultant list of the retrievable contents to the controller 82. In step S57, the controller 82 controls the external I/F 30 to acquire the retrievable content (recommended content) having the greatest combined score from the content DB 41 of the content server 12, based on the list of the retrievable contents supplied from the sort unit 29, and stores the acquired retrievable contents in the user content DB 23. The controller 82 also supplies the recommended content from the user content DB 23 to the content reproduction unit 31, which reproduces the recommended content. The content presenting process is now put to an end.

Figure 11:
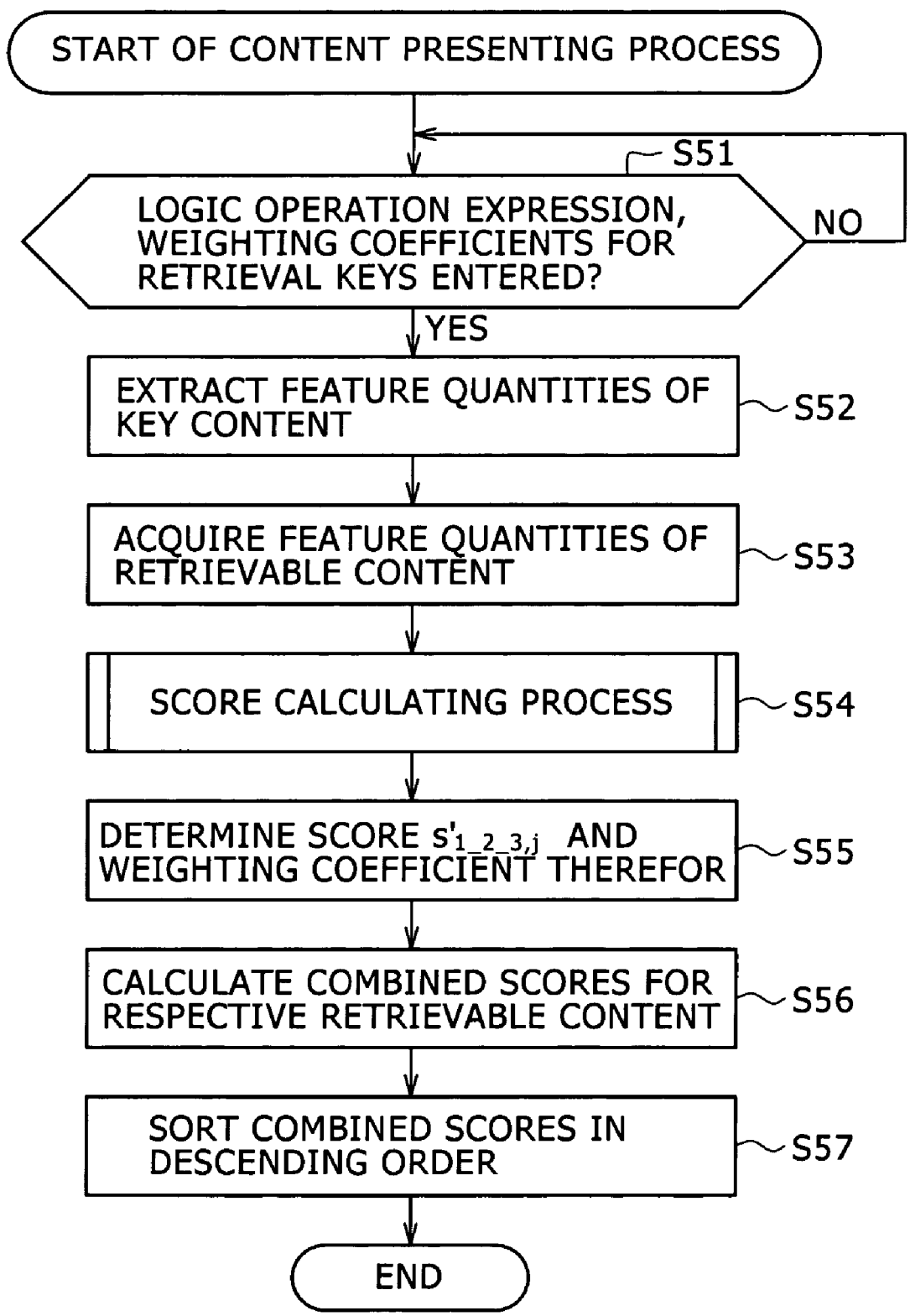
FIG. 11 is a flowchart of a content presenting process performed by the content presenting system shown in FIG. 8.

According to the content presenting process shown in FIG. 11, as shown in FIG. 9 or 10, if weighting coefficients for retrieval keys or weighting coefficients for feature quantities are entered in addition to the logic operation expression, content can be retrieved in a manner to reflect the weighting coefficients, and presented to the user as content best suited to the user.

If, for example, the weight for mood is set to a larger value and the weights for tempo and the number of sounds are set to smaller values, then it is possible to retrieve music pieces with more importance attached to mood and present those music pieces to the user.

In the above embodiments, the retrieval keys in the logic operation expression that is entered through the input unit 21 (or the input unit 81) by the user are designated from among the contents owned by the user, i.e., the contents stored in the user content DB 23, and the retrievable contents are retrieved from contents that are not owned by the user, i.e., the contents stored in the content DB 41 of the content server 12. However, retrieval keys (key content) and retrievable content may be either owned by the user or owned by an external server insofar as their feature quantities are known.

For example, both retrieval keys (key content) and retrievable content may include content stored in the user content DB 23 of the content presenting apparatus 11. In this case, the content presenting process shown in FIGS. 7 and 11 acts as a function to personalize content for presenting content stored in the user content DB 23 to the user in the descending order of user's preference levels.

Specifically, it is assumed that some of the music pieces that the user has already listened to among many music pieces (content) stored in the user content DB 23 are used as key content, and degrees of preference ranging from love to hate are set in a range from 1.0 to –1.0, which are used as weighting coefficients for retrieval keys in the input unit 81. In the input unit 81, furthermore, the logic operators between retrieval keys are all set to OR.

For example, the user enters "the logic operation expression: music piece 1 OR music piece 2 OR music piece 3, a weighting coefficient for music piece 1: 0.3, a weighting coefficient for music piece 2: 1.0, and a weighting coefficient for music piece 3: –0.5" through the input unit 21.

When the logic operation expression and the weighting coefficients are thus entered, the content presenting apparatus 11 optimizes (personalizes) the retrievable contents stored in the user content DB 23 to the preference of the user based on the preference of the user for the music piece 1, the music piece 2, and the music piece 3.

The logic operators AND, OR, and NOT may represent logic operations other than multiplication (×), addition (+), and subtraction (–) as described above. For example, as regards logic operations on two contents, i.e., a content P and a content Q, the logic operation (content P AND content Q) may represent a smaller one of the scores of the content P and the content Q, the logic operation (content P OR content Q) may represent a greater one of the scores of the content P and the content Q, and the logic operation (content P NOT content Q) may represent zero if the score of the content Q is equal to or greater than a certain threshold, and represent the score of the content P otherwise.

In the above embodiments, similarities and scores are calculated for respective contents. However, similarities and scores may be calculated for respective feature quantities of contents, such as tempo and mood.

In the above embodiments, retrieval keys that are entered through the input unit 21 by the user represent the titles of music pieces. However, features of content such as music pieces of fast tempos may be entered as retrieval keys through the input unit 21. In this case, the content presenting apparatus 11 operates when music pieces (content) having tempos (feature quantities of content) equal to or greater than a certain value are given as retrieval keys.

The above processing sequence may be performed by either hardware or software. If the processing sequence is performed by software, then it may be executed as a program by a (personal) computer as shown in FIG. 12.

As shown in FIG. 12, a CPU (Central Processing Unit) 301 performs various processes according to a program recorded in a ROM (Read Only Memory) 302 or a program loaded from a storage unit 308 into a RAM (Random Access Memory) 303. The RAM 303 also stores data required for the CPU 301 to perform the various processes.

The CPU 301 carries out the processes which are performed by the control unit 22, the feature quantity extraction unit 24, the similarity calculating unit 26, the score calculating unit 27, the combining unit 28, and the sort unit 29 of the content presenting apparatus 11 shown in FIG. 1, for example.

The CPU 301, the ROM 302, and the RAM 303 are connected to each other by a bus 304. An input/output interface 305 is connected to the bus 304.

To the input/output interface 305, there are connected an input unit 306 including a keyboard, a mouse, etc., an output unit 307 including a display unit such as a CRT (Cathode Ray Tube), a LCD (Liquid Crystal Display), or the like, and speakers, the memory 308 including a hard disk or the like, and a communication unit 309 including a modem, a terminal adapter, or the like. The communication unit 309 performs communications through a network such as the Internet.

The input unit 306 functions as the input unit 21 of the content presenting apparatus 11, for example, and the storage unit 308 functions as the user content DB 23 and the feature quantity DB 25 of the content presenting apparatus 11, for example. The communication unit 309 functions as the external I/F 30 of the content presenting apparatus 11, for example.

A drive 310 is also connected to the input/output interface 305, if necessary. A magnetic disk 321, an optical disk 322, a magneto-optical disk 323, or a semiconductor memory 324 is mounted in the drive 310. A computer program that is read from either one of these storage mediums by the drive 310 is installed in the storage unit 308.

In the present specification, the steps that are described in the flowcharts include not only processing details that are carried out chronologically in the order of the steps, but also processing details that are carried out parallel or individually, rather than chronologically.

What is claimed is:

1. An information processing apparatus for retrieving contents from among a plurality of retrievable contents (content $A_1 \ldots$ content $A_n$), comprising:
    an input unit configured to receive as input a logic operation expression defined by a plurality of retrieval keys designating a plurality of key contents (content $KB_\sim \ldots$ content KBm), respectively, and logic operators defining logic relationships there between, said input unit being configured to enter weights for the respective feature quantities of the contents;
    a similarity calculating unit configured to calculate, for each one of the plurality of key contents, a similarity distance (D) between the plurality of key contents designated by the retrieval keys of said logic operation expression and the plurality of retrievable contents, using a plurality of types of feature quantities of at least one of the retrieval contents and the key contents, each type of feature quantity of the retrievable contents being assigned a respective value from within a range of values $(V_{A1} \ldots V_{An})$ that indicates a degree of the type of feature quantity occurring in the retrievable contents (content $A_1 \ldots$ content $A_n$) and each type of feature quantity of the key contents being assigned a respective value from within a range of values $(V_{KB1} \ldots V_{KBm})$ that indicates a degree of the type of feature quantity occurring in the key contents (content $KB_1 \ldots$ content $KB_m$), such that $D=\sqrt{\{(V_{A1}-V_{KB1})^2+(V_{A2}-V_{KB2})^2+ \ldots (V_{An}-V_{KBm})^2\}}$, said similarity calculating unit being configured to calculate similarity D between the key contents and the retrievable contents using a plurality of feature quantities of the contents which are weighted by said weights entered through said input unit with respect to all said key contents;
    a combined score calculating unit, including a processor, configured to calculate a combined score S for each one of the retrievable contents by performing logic operations using said similarity D between the key contents and the retrievable contents corresponding to the retrieval keys such that $S=1/(D+\alpha)$, where $\alpha$ is a predetermined constant; and
    a presenting unit configured to display on a visual display contents from among said retrievable contents based on said combined score calculated by said combined score calculating unit, the presenting unit being configured to display each of the plurality of combined scores with respect to at least one of the plurality of key contents.

2. The information processing apparatus according to claim 1, further comprising: an extracting unit configured to extract each of said feature quantities of the contents.

3. The information processing apparatus according to claim 1, wherein each of said logic operators comprises at least one of AND, OR, and NOT.

4. A method of processing information for retrieving contents from among a plurality of retrievable contents (content $A_1 \ldots$ content $A_n$), the method comprising:
    entering a logic operation expression defined by a plurality of retrieval keys designating a plurality of key contents (content $KB_1 \ldots$ content $KB_m$), respectively, and logic operators defining logic relationships there between, said entering including entering weights for the respective feature quantities of the contents;
    calculating, for each one of the plurality of key contents, a similarity distance (D) between the plurality of key contents designated by the retrieval keys of said logic operation expression and the plurality of retrievable contents using a plurality of types of feature quantities of at least one of the retrieval contents and the key contents, each type of feature quantity of the retrievable contents being assigned a respective value from within a range of values $(V_{A1} \ldots V_{An})$ that indicates a degree of the type of feature quantity occurring in the retrievable contents (content $A_1 \ldots$ content $A_n$) and each type of feature quantity of the key contents being assigned a respective value from within a range of values $(V_{KB1} \ldots V_{KBm})$ that indicates a degree of the type of feature quantity occurring in the key contents (content $KB_1 \ldots$ content $KB_m$), such that $D=\sqrt{\{(V_{A1}-V_{KB1})^2+(V_{A2}-V_{KB2})^2+ \ldots (V_{An}-V_{KBm})^2\}}$, said calculating including calculating similarity D between the key contents and the retrievable contents using a plurality of feature quantities of the contents which are weighted by said weights with respect to all said key contents;
    calculating a combined score (S) for the respective retrievable contents by performing logic operations using said similarity D between the key contents and the retrievable contents corresponding to the retrieval keys, such that $S=1/(D+\alpha)$, where $\alpha$ is a predetermined constant; and
    presenting contents from among said retrievable contents, based on said combined score calculated in said combined score calculating step, the presenting including displaying each of the plurality of combined scores with respect to at least one of the plurality of key contents.

5. A computer readable, tangible storage medium encoded with a computer readable program configured to cause an information processing apparatus to execute a method for retrieving contents from among a plurality of retrievable contents (content $A_1 \ldots$ content $A_n$), comprising:
    entering a logic operation expression defined by a plurality of retrieval keys designating a plurality of key contents (content KB1 . . . content KBm), respectively, and logic operators defining logic relationships there between, said entering including entering weights for the respective feature quantities of the contents;

calculating, for each one of the plurality of key contents, a similarity distance (D) between the plurality of key contents designated by the retrieval keys of said logic operation expression and the plurality of retrievable contents using a plurality of types of feature quantities of at least one of the retrieval contents and the key contents, each type of feature quantity of the retrievable contents being assigned a respective value from within a range of values ($V_{A1} \ldots V_{An}$) that indicates a degree of the type of feature quantity occurring in the retrievable contents (content $A_1 \ldots$ content $A_n$) and each type of feature quantity of the key contents being assigned a respective value from within a range of values ($V_{KB1} \ldots V_{KBm}$) that indicates a degree of the type of feature quantity occurring in the key contents (content $KB_1 \ldots$ content $KB_m$), such that $D=\sqrt{\{(V_{A1}-V_{KB1})^2+(V_{A2}-V_{KB2})^2+ \ldots (V_{An}-V_{KBm})^2\}}$, said calculating including calculating similarity D between the key contents and the retrievable contents using a plurality of feature quantities of the contents which are weighted by said weights with respect to all said key contents;

calculating a combined score (S) for the respective retrievable contents by performing logic operations using said similarity D between the key contents and the retrievable contents corresponding to the retrieval keys, such that $S=1/(D+\alpha)$, where $\alpha$ is a predetermined constant; and presenting contents from among said retrievable contents, based on said combined score calculated in said combined score calculating step, the presenting including displaying each of the plurality of combined scores with respect to at least one of the plurality of key contents.

6. The information processing apparatus according to claim 1, wherein types of feature quantities are represented by numerical values ranging from 0 to 1, indicating a degree of each of a type of feature.

7. The information processing apparatus according to claim 1, wherein the plurality of retrieval keys in the logic operation expression entered through the input unit are designated from contents owned by a user, and the retrievable contents are retrieved from contents that are not owned by the user.

8. The information processing apparatus according to claim 2, wherein the types of feature quantities of the key content are supplied from the extracting unit to the similarity calculating unit, and the similarity calculating unit is supplied with feature quantities of all retrievable contents.

9. The information processing apparatus according to claim 2, wherein the extracting unit is configured to acquire contents designated by a retrieval key from the user content database, extract a feature quantity of the key contents, and supply the extracted feature quantity to the similarity calculating unit.

10. The information processing apparatus according to claim 9, wherein, when the extracting unit is supplied with a plurality of retrieval keys from a control unit, the extracting unit extracts types of feature quantities of a plurality of key contents and supplies the extracted feature quantities to the similarity calculating unit.

11. The information processing apparatus according to claim 1, further comprising:

a sort unit configured to supply a control unit with a list of retrievable contents that are sorted in the descending order of each combined score.

12. The information processing apparatus according to claim 2, further comprising:

a user content database configured to store contents acquired by a user and to store contents acquired from a content server through an external I/F, and to store contents acquired through a driver from a recording medium, wherein the contents stored in the user content database are supplied to the extracting unit or a content reproduction unit.

13. The information processing apparatus according to claim 12, further comprising:

a control unit configured to control an external I/F to acquire contents having the greatest combined score, to store the contents which are acquired in a user content database, and to reproduce the contents which are acquired on a content reproduction unit.

14. The information processing apparatus according to claim 2, further comprising:

a control unit configured to supply said retrieval keys from the input unit to the extracting unit and to supply the logic operation expression from the input unit to the combined score calculating unit.

15. The information processing apparatus according to claim 1, wherein a represents a predetermined constant added to prevent a denominator of said combined score S from becoming zero even if said similarity D is zero.

* * * * *